(12) United States Patent
Guo et al.

(10) Patent No.: US 10,873,763 B2
(45) Date of Patent: Dec. 22, 2020

(54) VIDEO COMPRESSION TECHNIQUES FOR HIGH DYNAMIC RANGE DATA

(71) Applicant: Apple Inc., Cupertino, CA (US)

(72) Inventors: Mei Guo, San Jose, CA (US); Jun Xin, Sunnyvale, CA (US); Yeping Su, Sunnyvale, CA (US); Chris Chung, Sunnyvale, CA (US); Dazhong Zhang, Milpitas, CA (US); Xiaosong Zhou, Campbell, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 363 days.

(21) Appl. No.: 15/613,081

(22) Filed: Jun. 2, 2017

(65) Prior Publication Data

US 2018/0352259 A1 Dec. 6, 2018

(51) Int. Cl.

| | |
|---|---|
| *H04N 19/61* | (2014.01) |
| *H04N 19/52* | (2014.01) |
| *H04N 19/18* | (2014.01) |
| *H04N 19/182* | (2014.01) |
| *H04N 19/124* | (2014.01) |
| *H04N 19/91* | (2014.01) |
| *H04N 19/119* | (2014.01) |
| *H04N 19/196* | (2014.01) |
| *H04N 19/176* | (2014.01) |
| *H04N 19/85* | (2014.01) |
| *H04N 19/122* | (2014.01) |
| *H04N 19/82* | (2014.01) |

(52) U.S. Cl.
CPC ......... *H04N 19/619* (2014.11); *H04N 19/119* (2014.11); *H04N 19/124* (2014.11); *H04N 19/176* (2014.11); *H04N 19/18* (2014.11); *H04N 19/182* (2014.11); *H04N 19/196* (2014.11); *H04N 19/52* (2014.11); *H04N 19/85* (2014.11); *H04N 19/91* (2014.11); *H04N 19/122* (2014.11); *H04N 19/82* (2014.11)

(58) Field of Classification Search
CPC .................................................... H04N 19/186
See application file for complete search history.

(56) References Cited

U.S. PATENT DOCUMENTS

| | | | | |
|---|---|---|---|---|
| 6,845,214 | B1 * | 1/2005 | Funaya | H04N 21/23614 375/E7.134 |
| 2016/0360213 | A1 * | 12/2016 | Lee | H04N 19/132 |
| 2017/0041606 | A1 * | 2/2017 | Matsumura | H04N 19/117 |
| 2018/0176582 | A1 * | 6/2018 | Zhao | H04N 19/51 |
| 2019/0124368 | A1 * | 4/2019 | Francois | H04N 19/30 |

* cited by examiner

Primary Examiner — Jamie J Atala
Assistant Examiner — Hesham K Abouzahra
(74) Attorney, Agent, or Firm — BakerHostetler

(57) ABSTRACT

Techniques are disclosed for coding high dynamic range (HDR) data. According to such techniques, HDR data may be converted to a domain of uniform luminance data. The uniform domain data may be coded by motion compensated predictive coding. The HDR data also may be coded by motion compensated predictive coding, using a coding parameter that is derived from a counterpart coding parameter of the coding of the uniform domain data. In another technique, HDR data may be coded using coding parameters that are derived from HDR domain processing but distortion measurements may be performed in a uniform domain.

19 Claims, 5 Drawing Sheets

100

200

300

400

500

600

700

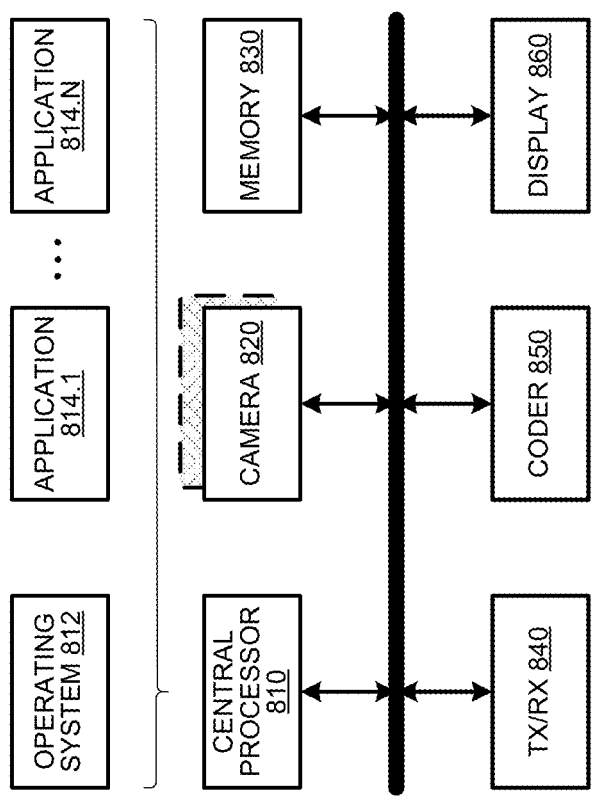

VIDEO COMPRESSION TECHNIQUES FOR HIGH DYNAMIC RANGE DATA

BACKGROUND

The present disclosure relates to video coding techniques and, in particular, to video coding techniques for high dynamic range data.

High dynamic range (HDR) image data describes representations of image and/or video data (collectively, "video") that possess a greater dynamic range of luminosity than was provided by predecessor imaging techniques. HDR data is designed to represent image data using a similar range of luminance that can be experienced through the human visual system. In HDR data, step sizes between successive luminance values are perceptually non-uniform. As compared to predecessor representations (called standard dynamic range data or "SDR" data herein), HDR data tends to provide better representations of image data at particularly dark or particularly bright image ranges.

Although many modern consumer electronic devices have been developed to exchange video data between them, most devices are designed to process SDR data, not HDR data. For example, there are a variety of coding protocols that have been developed to compress and exchange video data, including ITU-T H.265 (also called "HEVC"), H.264 ("AVC") and their predecessors. However, these standardized coding protocols are optimized to process SDR data. When they are required to process HDR data, they may make coding decisions that are sub-optimal.

The inventors perceive a need in the art for coding protocols that improve coding efficiencies and coding quality of HDR data. In particular, the inventors perceive a need to adapt the coding protocols that are already deployed for use on HDR video data.

BRIEF DESCRIPTION OF THE DRAWINGS

FIG. 8 illustrates an exemplary computer system suitable for use with embodiments of the present disclosure.

DETAILED DESCRIPTION

Embodiments of the present disclosure provide techniques for coding HDR data. According to such techniques, HDR data may be converted to a domain of perceptually uniform luminance. The HDR domain and the perceptually uniform domain may use different bit-depths for pixel representation (i.e., digital code words). The perceptually uniform domain data may be coded by motion compensated predictive coding. The HDR data also may be coded by motion compensated predictive coding, using a coding parameter that is converted from a counterpart coding parameter of the coding of the uniform domain data. In another embodiment, HDR data may be coded using coding parameters that are derived from HDR domain processing but distortion and complexity measurements may be performed in a perceptually uniform domain.

Figure 1:
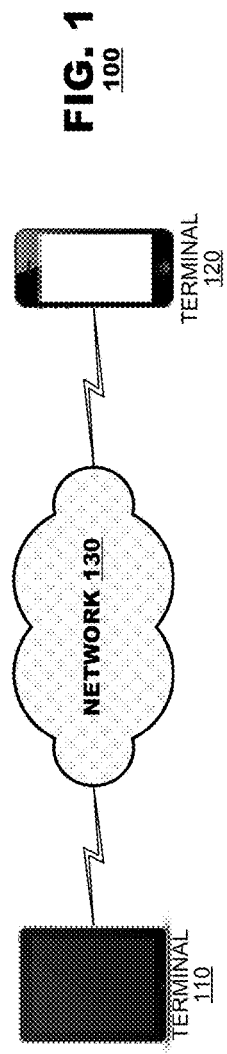
FIG. 1 is a simplified block diagram of a video delivery system according to an embodiment of the present disclosure.

FIG. 1 is a simplified block diagram of a video delivery system 100 according to an embodiment of the present disclosure. The system 100 may include a plurality of terminals 110, 120 interconnected via a network 130. The terminals 110, 120 may code HDR video data for transmission to their counterparts via the network 130. Thus, a first terminal 110 may capture HDR video data locally, code the video data and transmit the coded video data to the counterpart terminal 120 via a channel. The receiving terminal 120 may receive the coded video data, decode it, and render it locally, for example, on a display at the terminal 120. If the terminals are engaged in bidirectional exchange of video data, then the terminal 120 may capture video data locally (perhaps also as HDR data), code the video data and transmit the coded video data to the counterpart terminal 110 via another channel. The receiving terminal 110 may receive the coded video data transmitted from terminal 120, decode it, and render it locally, for example, on its own display.

A video coding system 100 may be used in a variety of applications. In a first application, the terminals 110, 120 may support real time bidirectional exchange of coded video to establish a video conferencing session between them. In another application, a terminal 110 may code pre-produced video (for example, television or movie programming) and store the coded video for delivery to one or, often, many downloading clients (e.g., terminal 120). Thus, the video being coded may be live or pre-produced, and the terminal 110 may act as a media server, delivering the coded video according to a one-to-one or a one-to-many distribution model. For the purposes of the present discussion, the type of video and the video distribution schemes are immaterial unless otherwise noted.

In FIG. 1, the terminals 110, 120 are illustrated as tablet computers and smart phones, respectively, but the principles of the present disclosure are not so limited. Embodiments of the present disclosure also find application with computers (both desktop and laptop computers), computer servers, media players, dedicated video conferencing equipment and/or dedicated video encoding equipment.

The network 130 represents any number of network that convey coded video data between the terminals 110, 120, including for example wireline and/or wireless communication network. The communication network 130 may exchange data in circuit-switched or packet-switched channels. Representative networks include telecommunications network, local area networks, wide area networks, and/or the Internet. For the purposes of the present discussion, the architecture and topology of the network 130 are immaterial to the operation of the present disclosure unless otherwise noted.

Figure 2:
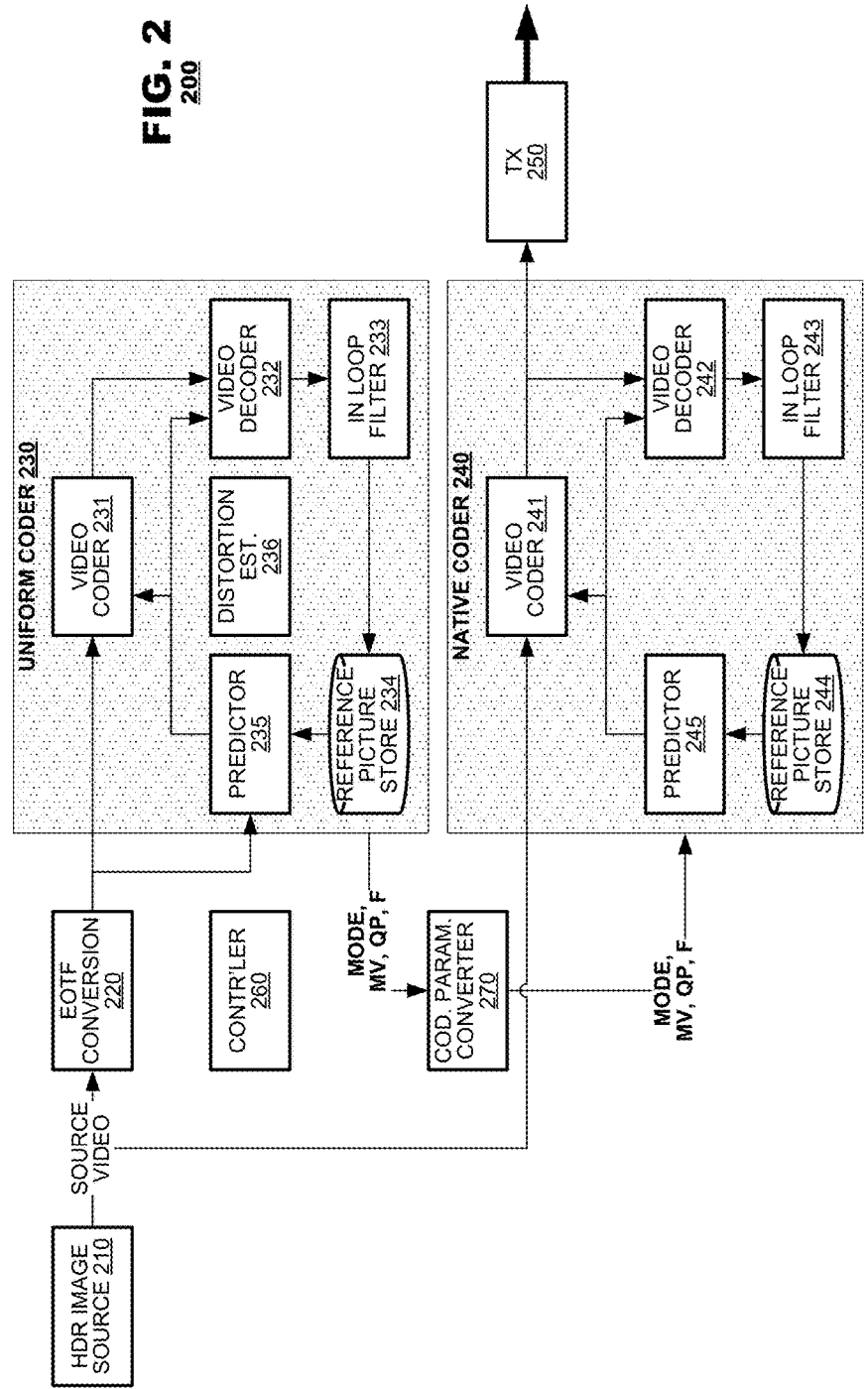
FIG. 2 is a functional block diagram of a system according to an embodiment of the present disclosure.

FIG. 2 is a functional block diagram of a system 200 according to an embodiment of the present disclosure. The system 200 may include an HDR image source 210, a conversion unit 220, first and second coding systems 230, 240, a transmitter 250 operating under control of a controller 260 and a coding-parameters conversion unit 270. The HDR image source 210 may furnish HDR images and/or video for coding by the system 200. The conversion unit 220 may convert image data from its native HDR domain to a second domain having perceptually uniform sample data. The first coding system 230, called a "uniform coder" for convenience, may perform video compression on the video data in the uniform domain. The second coding system 240 called a "native coder," may perform video compression on the video data in the HDR data's native space. The transmitter 250 may transmit coded data generated by the native coder 240 from the system 200.

The HDR image source 210 may be an HDR camera that supplies HDR video to the system. In other embodiments, the HDR image source 210 may be a storage device that stores HDR video from other source(s). Alternatively, the HDR image source 210 may be an application that executes on a terminal 110 (FIG. 1) and generates HDR video for processing.

The conversion unit 220 may convert the HDR video data from its native image space to a perceptually uniform space. The conversion may be based on electro-optical transform functions that characterize the HDR image source and the uniform domain on which the uniform coder 220 operates.

The uniform coder 220 may include a video coder 231, a video decoder 232, an in loop filter system 233, a reference picture store 234, a predictor 235, and a distortion estimator 236. The video coder 231 may generate a coded representation of its input image data, typically by exploiting spatial and/or temporal redundancies in the image data. The video coder 231 may output coded video data that consumes less bandwidth than the original source video. The video coder 231 may operate according to techniques defined in a predetermined coding protocol, such as HEVC), AVC or some other protocol.

The video decoder 232 may invert coding operations performed by the video coder 231 to obtain a reconstructed picture from the coded video data. Typically, the coding processes applied by the video coder 231 are lossy processes, which cause the reconstructed picture to possess various errors when compared to the original picture. The video decoder 231 may reconstruct select coded pictures, which are designated as "reference pictures," and store the decoded reference pictures in the reference picture store 234.

The predictor 235 may select prediction modes for new input pictures as they are coded. For each portion of the input picture being coded (called a "pixel block" for convenience), the predictor 235 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture.

When an appropriate prediction reference is identified, the predictor 235 may furnish the prediction data to the video coder 231. The video coder 231 may code input video data differentially with respect to prediction data furnished by the predictor 235. Typically, prediction operations and the differential coding operate on a pixel block-by-pixel block basis. Prediction residuals, which represent pixel-wise differences between the input pixel blocks and the prediction pixel blocks, may be subject to other coding operations, such as quantization, to reduce bandwidth further.

The distortion estimator 236 represents control systems within the uniform coder 230 to estimate distortion that would be obtained from different coding parameter selections. Operations of the uniform coder 230 may cause different levels of distortion in recovered video output from the in loop filter 233 as compared to input data from the conversion unit 220. For example, different selections of coding mode, prediction references, quantization parameter and filter settings each may have different impacts on the distortion imposed on recovered video. The distortion estimator 236 may measure such distortion effects on uniform domain processes performed by these other components of the uniform coder 230.

The video coder 231, video decoder 232, in loop filter system 233, reference picture store 234, predictor 235, and distortion estimator 236 all may operate on the video data output by the conversion unit 220 and, therefore, may operate in a domain of perceptually uniform luminance data.

The native coder 240 may include its own video coder 241, video decoder 242, in loop filter 243, reference picture store 244, and predictor 245. The video coder 241, video decoder 242, in loop filter 233, and reference picture store 244 may operate in much the same way as their counterparts 231, 232, 233, and 234 in the uniform coder 230. The video coder 241 may generate a coded representation of its input image data, again by exploiting spatial and/or temporal redundancies in the image data. The video coder 241 may output coded video data that consumes less bandwidth than the original source video. The video coder 241 may operate according to the same protocol as the video coder 231 does.

The video decoder 242 may invert coding operations performed by the video coder 241 to obtain a reconstructed picture from the coded video data. Again, the coding processes applied by the video coder 241 may be lossy processes, which cause the reconstructed picture to possess various errors when compared to the original picture. The video decoder 241 may reconstruct reference pictures, which coincide with the frames selected as reference pictures by the uniform coder 230 and may store them to the reference picture store 244.

The coding-parameters converter 270 converts the coding parameters (e.g., mode, MV, QP, . . . ) derived from the uniform coder 230 for the coding of HDR data in native coder 240.

The predictor 245 may operate according to coding selections converted from the selections made by the predictor 235 of the uniform coder 230. For example, the predictor 245 may retrieve pixel blocks identified by the coding mode selections, which are derived from the uniform coder predictor 235 and adjusted by the coding-parameters converter 270, and furnish those pixel blocks to the video coder 241, which the video coder 241 may use for differential coding. The predictor 245 of the native coder 240 need not perform prediction searches of its own and, instead, may re-use results of searches obtained by the predictor 235 from the uniform coder.

The predictor 245 of the native coder 240 may not directly use the converted coding selections from the uniform coder, but may perform searches and make coding selections based on those coding selections which are derived from the uniform coder predictor 235 and adjusted by the coding parameter converter 270. The predictor 245 retrieves the pixel blocks and furnishes those pixel blocks to the video coder 241, and then video coder 241 uses those pixel blocks for differential coding.

The video coder 241, video decoder 242, in loop filter 243, reference picture store 244, and predictor 245 all may operate on the video data in the native domain of the HDR video signal.

Coded video data from the video coder 241 of the native coder 240 may be output to a transmitter 250, which may output coded video data from the system 200. Where the coded video data is to be output from the system 200 for transmission over a network, the transmitter 250 may package the coded video into transmission units and format the transmission units into a format that is appropriate for a communication protocol to which the network adheres. In other embodiments, the coded video may be sent to a storage device for later use.

The embodiment of FIG. 2 is expected to provide improved coding over other systems that perform prediction in the native domain of an HDR signal. Conventional video coding systems, including those based on HEVC, are not optimized for HDR data. Thus, by converting HDR data to a uniform domain, selecting prediction parameters on the basis of the uniform data, converting the coding parameters to HDR space, and utilizing those prediction parameters to code HDR representations of video data, improved prediction is expected to be achieved.

Embodiments of the present disclosure may use other uniform domain coding parameters to code data in an HDR domain. For example, a uniform coder 220 may select quantization parameters QP to be used by the video coder 231 when quantizing pixel block data. Such quantization parameter selections generally will not be used directly in the native coder 240, but will be transformed through a function that depends on the relationship between the uniform coding space and the native coding space, for example the electro-optical transform functions of two spaces. After the adjustment in coding-parameters converter 270, the transformed QP may be used when coding HDR domain video data in a video coder 241.

Moreover, selections of other coding parameters, such as coding unit (CU) size decisions, prediction unit (PU) size decisions, transform unit (TU) size decisions, Sample Adaptive Offset (SAO) filter parameters, deblocking filtering parameters, quantization scaling matrices may be performed by the uniform coder 230, transformed by the coding parameter converter 270 and used to determine the same parameters in native coder 240.

Figure 3:
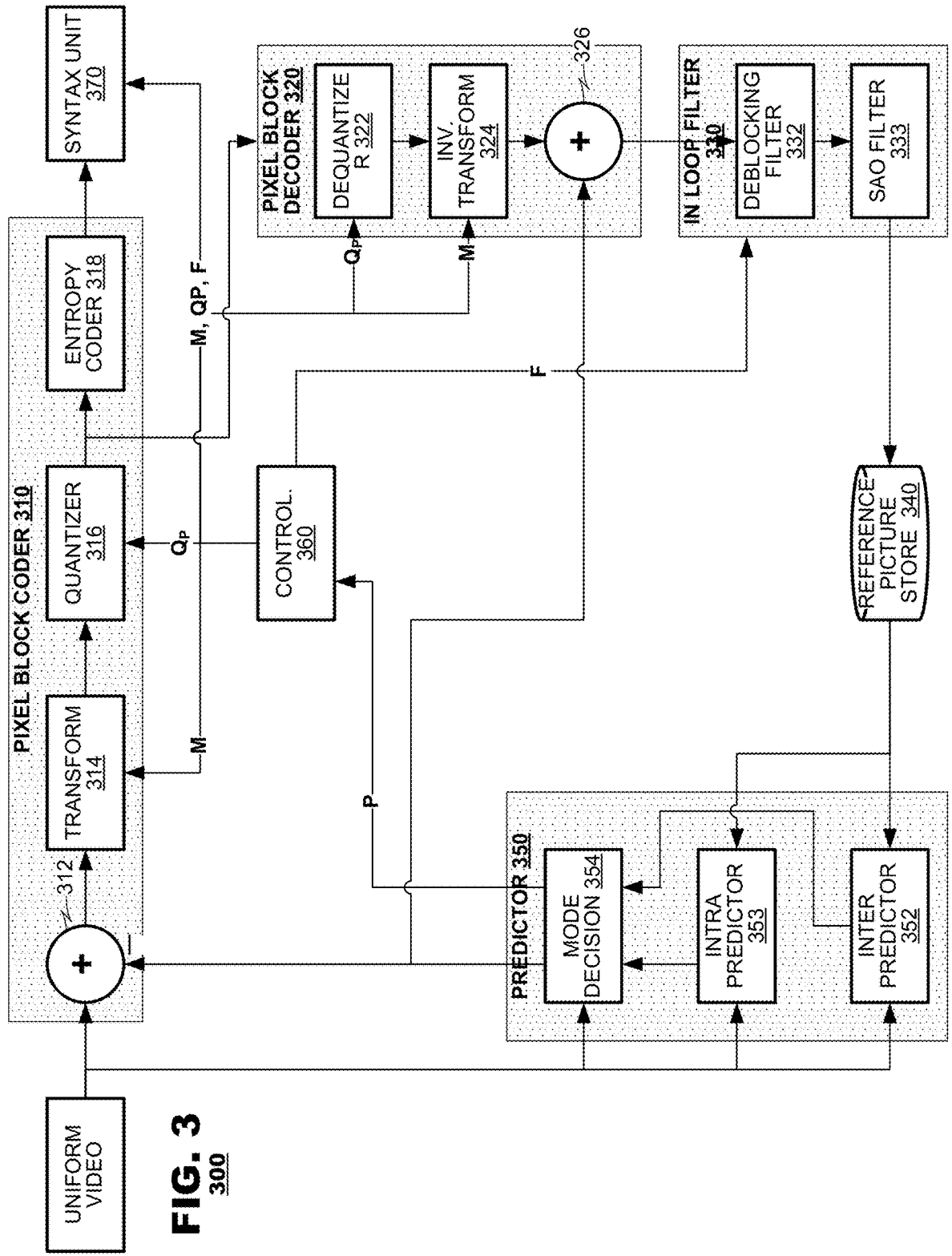
FIG. 3 is another functional block diagram of a coding system according to an embodiment of the present disclosure.

FIG. 3 is a functional block diagram of a coding system 300 according to an embodiment of the present disclosure that may find application as a uniform coder (FIG. 2). The system 300 may include a pixel block coder 310, a pixel block decoder 320, an in-loop filter system 330, a reference picture store 340, a predictor 350, a controller 360, and a syntax unit 370. The pixel block coder and decoder 310, 320 and the predictor 350 may operate iteratively on individual pixel blocks of a picture. The predictor 350 may predict data for use during coding of a newly-presented input pixel block. The pixel block coder 310 may code the new pixel block by predictive coding techniques and present coded pixel block data to the syntax unit 370. The pixel block decoder 320 may decode the coded pixel block data, generating decoded pixel block data therefrom. The in-loop filter 330 may perform various filtering operations on a decoded picture that is assembled from the decoded pixel blocks obtained by the pixel block decoder 320. The filtered picture may be stored in the reference picture store 340 where it may be used as a source of prediction of a later-received pixel block. The syntax unit 370 may assemble a data stream from the coded pixel block data which conforms to a governing coding protocol.

The pixel block coder 310 may include a subtractor 312, a transform unit 314, a quantizer 316, and an entropy coder 318. The pixel block coder 310 may accept pixel blocks of input data at the subtractor 312. The subtractor 312 may receive predicted pixel blocks from the predictor 350 and generate an array of pixel residuals therefrom representing a difference between the input pixel block and the predicted pixel block. The transform unit 314 may apply a transform to the sample data output from the subtractor 312, to convert data from the pixel domain to a domain of transform coefficients. The quantizer 316 may perform quantization of transform coefficients output by the transform unit 314. The quantizer 316 may be a uniform or a non-uniform quantizer. The entropy coder 318 may reduce bandwidth of the output of the coefficient quantizer by coding the output, for example, by variable length code words.

The transform unit 314 may operate in a variety of transform modes as determined by the controller 360. For example, the transform unit 314 may apply a discrete cosine transform (DCT), a discrete sine transform (DST), a Walsh-Hadamard transform, a Haar transform, a Daubechies wavelet transform, or the like. In an embodiment, the controller 360 may select a coding mode M to be applied by the transform unit 315, may configure the transform unit 315 accordingly and may signal the coding mode M in the coded video data, either expressly or impliedly.

The quantizer 316 may operate according to a quantization parameter $Q_P$ that is supplied by the controller 360. In an embodiment, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 318, as its name implies, may perform entropy coding of data output from the quantizer 316. For example, the entropy coder 318 may perform run length coding, Huffman coding, Golomb coding and the like.

The pixel block decoder 320 may invert coding operations of the pixel block coder 310. For example, the pixel block decoder 320 may include a dequantizer 322, an inverse transform unit 324, and an adder 326. The pixel block decoder 320 may take its input data from an output of the quantizer 316. Although permissible, the pixel block decoder 320 need not perform entropy decoding of entropy-coded data since entropy coding is a lossless event. The dequantizer 322 may invert operations of the quantizer 316 of the pixel block coder 310. The dequantizer 322 may perform uniform or non-uniform de-quantization as specified by the decoded signal $Q_P$. Similarly, the inverse transform unit 324 may invert operations of the transform unit 314. The dequantizer 322 and the inverse transform unit 324 may use the same quantization parameters $Q_P$ and transform mode M as their counterparts in the pixel block coder 310. Quantization operations likely will truncate data in various respects and, therefore, data recovered by the dequantizer 322 likely will possess coding errors when compared to the data presented to the quantizer 316 in the pixel block coder 310.

The adder 326 may invert operations performed by the subtractor 312. It may receive the same prediction pixel block from the predictor 350 that the subtractor 312 used in generating residual signals. The adder 326 may add the prediction pixel block to reconstructed residual values output by the inverse transform unit 324 and may output reconstructed pixel block data.

The in-loop filter 330 may perform various filtering operations on recovered pixel block data. For example, the in-loop filter 330 may include a deblocking filter 332 and a sample adaptive offset ("SAO") filter 333. The deblocking filter 332 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 330 may operate according to parameters that are selected by the controller 360.

The reference picture store 340 may store filtered pixel data for use in later prediction of other pixel blocks. Different types of prediction data are made available to the predictor 350 for different prediction modes. For example, for an input pixel block, intra prediction takes a prediction reference from decoded data of the same picture in which the input pixel block is located. Thus, the reference picture store 340 may store decoded pixel block data of each picture as it is coded. For the same input pixel block, inter prediction may take a prediction reference from previously coded and decoded picture(s) that are designated as reference pictures. Thus, the reference picture store 340 may store these decoded reference pictures.

As discussed, the predictor 350 may supply prediction data to the pixel block coder 310 for use in generating residuals. The predictor 350 may include an inter predictor 352, an intra predictor 353 and a mode decision unit 352. The inter predictor 352 may receive pixel block data representing a new pixel block to be coded and may search reference picture data from store 340 for pixel block data from reference picture(s) for use in coding the input pixel block. The inter predictor 352 may support a plurality of prediction modes, such as P mode coding and B mode coding. The inter predictor 352 may select an inter prediction mode and an identification of candidate prediction reference data that provides a closest match to the input pixel block being coded. The inter predictor 352 may generate prediction reference metadata, such as motion vectors, to identify which portion(s) of which reference pictures were selected as source(s) of prediction for the input pixel block.

The intra predictor 353 may support Intra (I) mode coding. The intra predictor 353 may search from among pixel block data from the same picture as the pixel block being coded that provides a closest match to the input pixel block. The intra predictor 353 also may generate prediction reference indicators to identify which portion of the picture was selected as a source of prediction for the input pixel block.

The mode decision unit 352 may select a final coding mode to be applied to the input pixel block. Typically, as described above, the mode decision unit 352 selects the prediction mode that will achieve the lowest distortion when video is decoded given a target bitrate. Exceptions may arise when coding modes are selected to satisfy other policies to which the coding system 300 adheres, such as satisfying a particular channel behavior, or supporting random access or data refresh policies. When the mode decision selects the final coding mode, the mode decision unit 352 may output a selected reference block from the store 340 to the pixel block coder and decoder 310, 320 and may supply to the controller 360 an identification of the selected prediction mode along with the prediction reference indicators corresponding to the selected mode.

Figure 4:
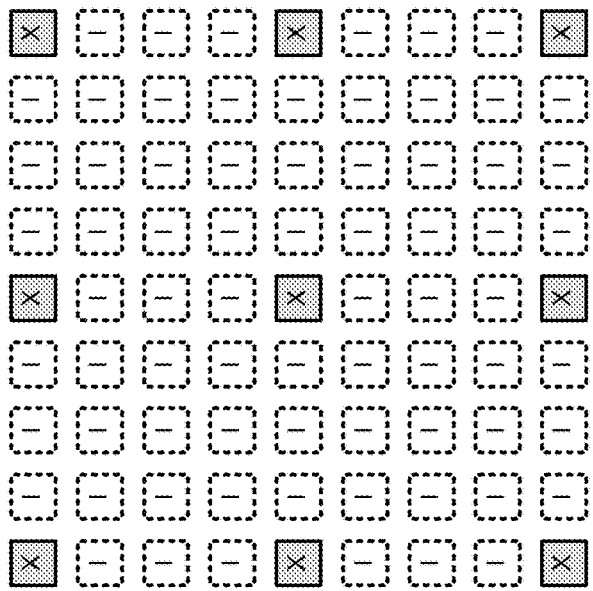
FIG. 4 illustrates an interpolation process suitable for use with embodiments of the present disclosure.

In an embodiment, video coders may apply interpolation filtering for inter prediction and intra prediction in a uniform space. As illustrated in FIG. 4, pixel interpolation typically involves derivation of pixel values at locations between source pixels (shown as X). If two pixels X are spaced apart by a unit pel location, interpolation may derive interpolated pixel values I at fractional locations between the unit pels, for example, at "quarter pel" distances from each other. In an embodiment, interpolation may be performed by intra predictors 353 (for intra prediction) and inter predictors 352 (for inter prediction) of a uniform coder 300. The predictor 350 may make prediction decisions that may be provided to a counterpart predictor of a native coder 240 through a converter 270 (FIG. 2).

In an embodiment, the pixel blocks retrieved by the predictor 245 may be converted to the uniform domain with electro-optical transform functions of HDR space and a uniform space as in EOTF conversion 220. The interpolation of the converted pixel blocks may be performed by intra predictors 353 (for intra prediction) and inter predictors 352 (for inter prediction) of a uniform coder 300. Then the interpolated pixels may be transformed to the HDR domain by the converter 270 and then used in the predictor 245. (FIG. 2). The decoder can also have a uniform decoder that computes the interpolated pixels in the uniform domain and a converter that converts the interpolated pixels to the native domain.

In another embodiment, these converted interpolated pixels can be used to inform the native coder 240 to improve the interpolation of HDR data without incurring a change in the decoder.

The controller 360 may control overall operation of the coding system 300. The controller 360 may select operational parameters for the pixel block coder 310 and the predictor 350 based on analyses of input pixel blocks and also external constraints, such as coding bitrate targets and other operational parameters. As part of this operation, the controller 360 may estimate distortion of the different selections of coding parameters that may be applied during coding and filtering. When it selects quantization parameters $Q_P$, the use of uniform or non-uniform quantizers, the transform mode M, and filter parameters F, it may provide those parameters to the syntax unit 370, which may include data representing those parameters in the data stream of coded video data output by the system 300. The controller 360 also may select between different modes of operation by which the system may generate reference images and may include metadata identifying the modes selected for each portion of coded data.

During operation, the controller 360 may revise operational parameters of the quantizer 316 and the transform unit 315 at different granularities of image data, either on a per pixel block basis or on a larger granularity (for example, per picture, per slice, per largest coding unit ("LCU") or another region). In an embodiment, the quantization parameters may be revised on a per-pixel basis within a coded picture.

Additionally, as discussed, the controller 360 may control operation of the in-loop filter 330 and the prediction unit 350. Such control may include, for the prediction unit 350, mode selection (lambda, modes to be tested, search windows, distortion strategies, etc.), and, for the in-loop filter 330, selection of filter parameters, reordering parameters, weighted prediction, etc.

FIG. 3 represents an architecture of a uniform coder 230 (FIG. 2) of a coding system. Thus, the video input to the coding system has been converted from the native domain of the HDR video data to a perceptually uniform luminance domain. As such, the pixel block coder 310, the pixel block decoder 320, the in loop filter 330, the reference picture store 340, the predictor 350 and the controller 360 may operate on video data in the perceptually uniform luminance domain.

In an embodiment, the architecture illustrated in FIG. 3 also may find application for use as a native coder 240 (FIG. 2). In such an embodiment, a predictor 350 need not perform processing of its own to determine prediction modes or to identify prediction references. Those modes and references may be provided to the native coder from a predictor of the uniform coder. Similarly, in a native coder, a controller 360 need not select transform modes M, quantization parameters QP or filtering parameters F through its own processing. Instead, those coding parameters may be supplied by a controller of a uniform coder.

Embodiments of the present disclosure also permit hybrid approaches. For example, it is permissible for a native coder to adopt prediction mode decisions and prediction references from decisions made by a uniform coder but to derive filter parameters F through local processing (or vice versa). Similarly, development of transform modes M and/or quantization parameters QP may be adopted from derivations performed by uniform coder in one embodiment but from local processing in another embodiment. It is expected that the selection of which parameters to derive from a uniform coder and which parameters to be derived through local processing of a native coder will be made by system designers to suit their own implementation needs.

Figure 5:
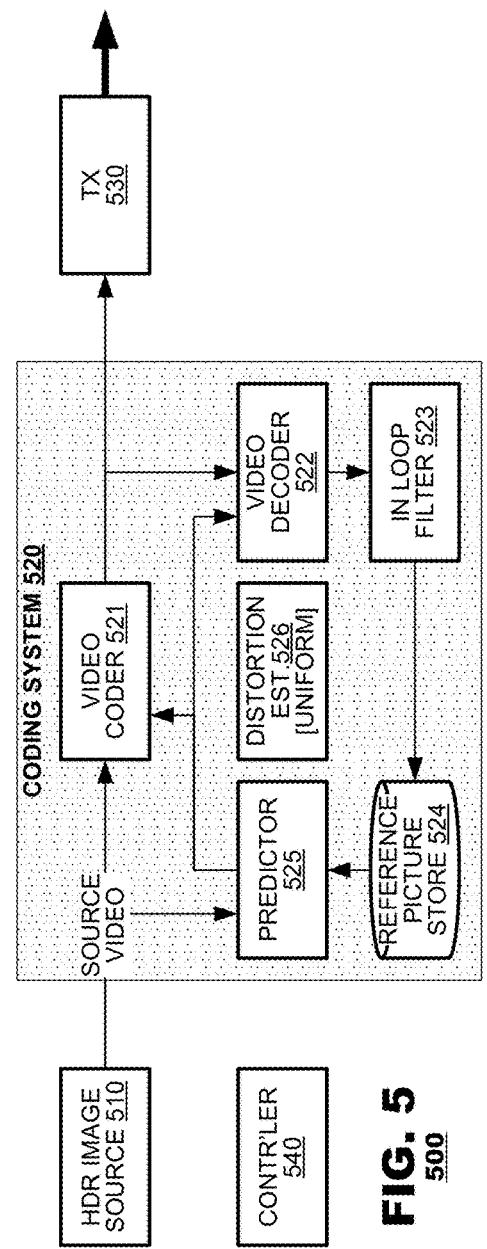
FIG. 5 illustrates a system according to another embodiment of the present disclosure.

FIG. 5 illustrates a system 500 according to another embodiment of the present disclosure. The system 500 may include an HDR image source, a coding system 520, and a transmitter 530, all operating under control of a controller 540. The HDR image source 510 may furnish HDR images and/or video for coding by the system 500. The coding system 520 may perform video compression on the video data in the HDR data's native space. The transmitter 530 may transmit coded data generated by the native coder 540 from the system 500.

The HDR image source 510 may be an HDR camera that supplies HDR video to the system. In other embodiments, the HDR image source 510 may be a storage device that stores HDR video from other source(s). Alternatively, the HDR image source 510 may be an application that executes on a terminal 110 (FIG. 1) and generates HDR video for processing.

The coding system 520 may include a video coder 521, a video decoder 522, an in loop filter system 523, a reference picture store 524, a predictor 525, and a distortion estimator 526. The video coder 521 may generate a coded representation of its input image data, typically by exploiting spatial and/or temporal redundancies in the image data. The video coder 521 may output coded video data that consumes less bandwidth than the original source video. The video coder 521 may operate according to techniques defined in a predetermined coding protocol, such as HEVC, H.264 or other protocol.

The video decoder 522 may invert coding operations performed by the video coder 521 to obtain a reconstructed picture from the coded video data. Typically, the coding processes applied by the video coder 521 are lossy processes, which cause the reconstructed picture to possess various errors when compared to the original picture. The video decoder 521 may reconstruct the pictures designated as "reference picture," and store the decoded reference pictures in the reference picture store 524.

The predictor 525 may select prediction modes for new input pictures as they are coded. For each pixel block, the predictor 525 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture.

When an appropriate prediction reference is identified, the predictor 525 may furnish the prediction data to the video coder 521. The video coder 521 may code input video data differentially with respect to prediction data furnished by the predictor 525. Typically, prediction operations and the differential coding operate on a pixel block-by-pixel block basis. Prediction residuals, which represent pixel-wise differences between the input pixel blocks and the prediction pixel blocks, may be subject to other coding operations, such as quantization, to reduce bandwidth further.

Interpolation for intra prediction and inter prediction is performed in the predictor 525. In one embodiment, the filter coefficients of interpolation for HDR data are determined with reference to an electro-optical transform function ("EOTF") of HDR data and an EOTF of data in a perceptually uniform domain. The HDR data and the uniform data may be represented with different bit depths. For example, the interpolation is performed between pixel A and pixel B, where the pixel value B is larger than the pixel value A. The filter coefficients of interpolation are selected based on a ratio of the slopes from the two EOTF curves (denoted as HDR_factor). As the HDR factor gets larger, larger coefficients may be applied to the pixel having larger pixel value (e.g., B). The filter coefficients of interpolation for various pixel brightness values could be stored in a look-up table at both encoder and decoder. The coefficients are adaptively selected based on the pixel brightness at both encoder and decoder.

Figure 7:
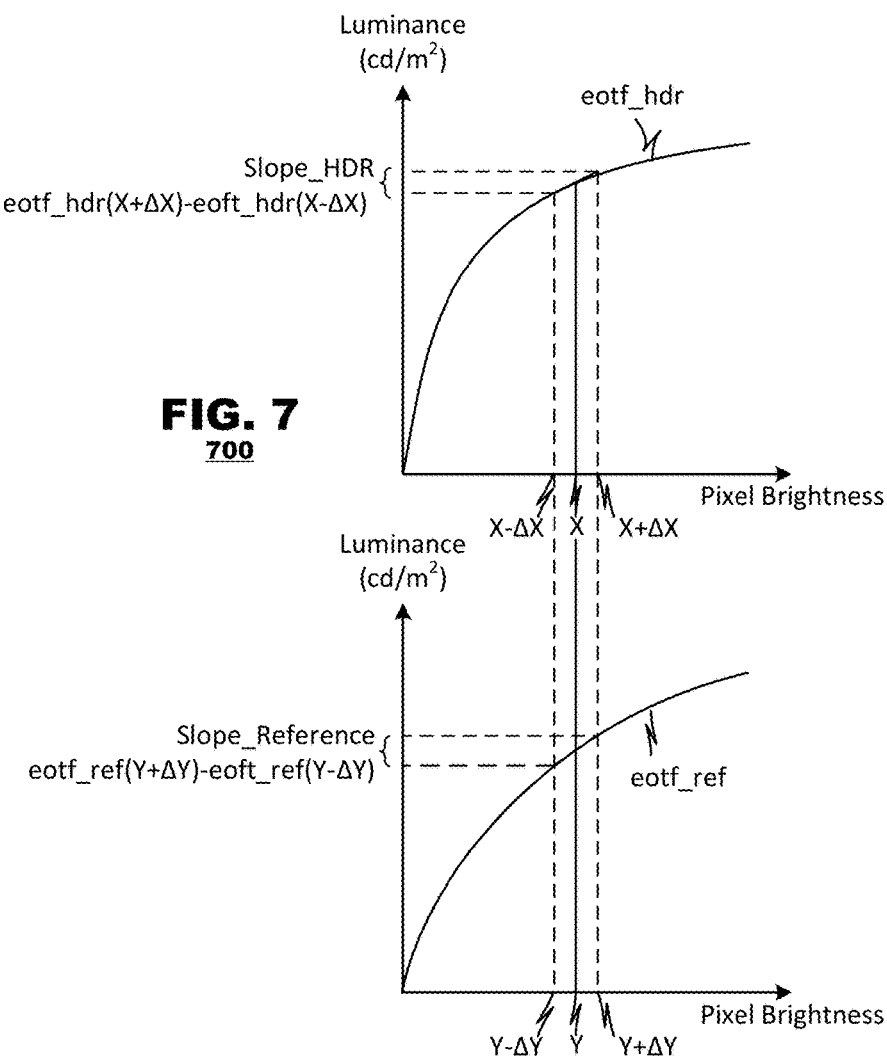
FIG. 7 illustrates exemplary electro-optical transfer function graphs of HDR data and reference data that illustrate operation of certain embodiments of the present disclosure.

FIG. 7 illustrates exemplary EOTF graphs of HDR data and reference data in a perceptually uniform domain. In this embodiment, the slopes may be derived based on a value representing an average brightness of pixels to be interpolated. The HDR factor may be calculated as a ratio of the slopes from the two EOTF curves, for example, as:

$$\text{HDR\_factor} = \frac{\text{slope\_HDR}}{\text{slope\_reference}},$$

where
slope_HDR represents the slope of the HDR EOTF curve at a point X, slope_reference represents the slope of the reference EOTF curve at the point Y. X represents the average brightness of pixels to be interpolated, and Y represents the corresponding brightness of pixels to X, where X and Y achieves the same luminance through the HDR EOTF (denoted as eotf_hdr) and the reference EOTF (denoted as eotf_ref) respectively as eotf_hdr(X)=eotf_ref (Y).

The distortion estimator 526 represents control systems within the coding system 520 to estimate distortion that would be obtained from different coding parameter selections. Operations of the coding system 520 may cause different levels of distortion in recovered video output from the in loop filter 523 as compared to input data from the conversion unit 520. For example, different selections of coding mode, prediction references, quantization parameter and filter settings each may have different impacts on the distortion imposed on recovered video. The distortion estimator 526 may measure such distortion effects on uniform domain processes performed by these other components of the coding system 520.

In an embodiment, the video coder 521, video decoder 522, in loop filter system 523, reference picture store 524, and predictor 525 may operate on video in the native domain of the HDR video, which may involve non-uniform luminance data. Operations of the distortion estimator 526, however, may operate in a perceptually uniform luminance domain. Thus distortion measurements or complexity measurements may be converted from the non-uniform domain of the HDR video to a perceptually uniform luminance domain, and distortion and complexity may be estimated from these converted measurements. Here, again, distortion and complexity estimates may be performed as part of selection of coding parameters, including CU size decisions, PU size decisions, TU size decision, SAO filtering parameter decisions, deblocking filtering parameter decisions, and quantization scaling matrices decisions. Candidate parameter decisions may be applied to video data, then compared to source HDR data to estimate distortion. Then the estimated distortions may be further converted to a perceptually uniform domain to achieve decisions. Alternately, distortion or complexity measurements can be made in the uniform domain directly to achieve decisions.

In many applications, selection of coding parameters may involve an estimation of complexity of pixel block data that is to be coded. For example, in HEVC, image data may be parsed into coding units (CUs) of various sizes based on complexity of video data. Thereafter, selection of coding parameters such as quantization parameter QP also may be driven, at least in part, based on complexity.

Figure 6:
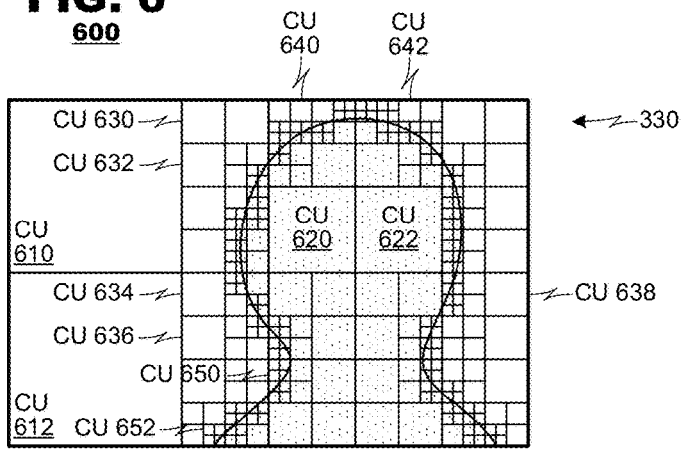
FIG. 6 illustrates an exemplary frame of video data that may be processed by embodiments of the present disclosure.

FIG. 6 illustrates an exemplary frame of video data that may be parsed into CUs of different sizes based on complexity of image content. In this example, a foreground object having generally uniform content is provided in front of a background object also having generally uniform content. Thus, a discontinuity in image content occurs at a boundary between the foreground and background image content.

This example illustrates coding units of five different sizes. A largest partition of the frame is called a largest coding unit (LCU) and is illustrated by CUs 610, 612. Progressively smaller CUs are illustrated at different sizes: CUs 620, 622 are a second level of CUs, CUs 630-636 illustrate a third level of CUs, CUs 640-642 illustrate a fourth level of CUs and CUs 650-652 illustrate a fifth level of CUs. In this example, the CUs are organized into a quadratic tree structure in which, CUs at each level, if they are parsed by another level, are parsed into four smaller CUs of the next smaller size. In practice, a governing coding protocol (e.g., HEVC) defines the partitioning protocol and the number of levels that are supported by a video coder.

In an embodiment, complexity determinations for CUs may be made with reference to an electro-optical transform function ("EOTF") of HDR data and an EOTF of data in a perceptually uniform domain. While HDR may allow for representations of a wider dynamic range of luminosity, may be a higher precision representation than SDR data, it may use different EOTFs than SDR data. An EOTF generally defines relationships between digital code words in a source domain and linear luminance values. Compared to SDR processing which uses Gamma EOTF as recommended in ITU-R BT.1886, HDR processing has a greater dynamic range of luminosity to reproduce the real world and adopts a different EOTF, for example, perceptual quantizer (PQ) as recommended in SMPTE ST 2084. With an HDR EOTF, coding distortion and activity measurements are related to the brightness of pixels.

In an embodiment, complexity determinations often are made as a sum of absolute differences of pixel values in a candidate CU, although other derivation techniques such as the sum of absolute transformed differences (SATD) or the sum of squared differences (SSD) may be used. Once a complexity estimate is calculated, it may be adjusted based on an HDR factor that is derived from a comparison of the slope of an EOTF curve that characterizes the HDR data and a slope of a perceptually uniform EOTF curve that characterizes the HDR or SDR data. FIG. 7 illustrates exemplary EOTF graphs of HDR data and reference data; the slopes may be derived based on a value representing an average brightness of pixels in the candidate CU.

In an embodiment, the HDR factor may be calculated as a ratio of the slopes from the two EOTF curves, for example, as:

$$\text{HDR\_factor} = \frac{\text{slope\_HDR}}{\text{slope\_reference}},$$

where
slope_HDR represents the slope of the HDR EOTF curve at a point X, slope_reference represents the slope of the reference EOTF curve at the point Y. X represents the average brightness of pixels in the candidate CU, and Y represents the corresponding brightness of pixels to X, where X and Y achieves the same luminance through the HDR EOTF (denoted as eotf_hdr) and the reference EOTF (denoted as eotf_ref) respectively as eotf_hdr(X)=eotf_ref (Y).

In an embodiment, complexity measurements may be first performed in the HDR domain and then adjusted by an HDR factor to convert an estimate of CU complexity from HDR domain to the reference domain. The conversion may be performed by a distortion estimator 526 (FIG. 5) For example, adjusted complexity measurements may be given by:

$$\text{Complexity}_{Uniform} = \text{Complexity}_{HDR} * \text{pow}(\text{HDR\_factor}, n), \text{ where}$$

n is the exponent and HDR_factor is the base of the power function. n is a scalar value and it could be a fixed value or could be adaptively determined with the adopted measurements to evaluate the CU complexity. Complexity$_{HDR}$ represents a complexity estimate in the HDR domain and Complexity$_{uniform}$ represents a complexity estimate converted from the HDR domain to the reference uniform domain. The HDR factor may be applied as an adjustment to the complexity and distortion estimated in HDR domain to convert the distortion and complexity measurements from HDR domain to the reference domain.

The coding parameters for example quantization parameters QPs are derived with Complexity$_{uniform}$ by the native coder 520. The derived QP is denoted as QP$_{Uniform}$. Then an HDR quantization adjustment ΔQP may be applied to compensate the influence of the brightness of pixels on distortion. The HDR quantization adjustment ΔQP is derived from the HDR factor according to:

$$\Delta QP = -6 * \log_2(\text{HDR\_factor}).$$

(QP$_{uniform}$+ΔQP) is applied to video coder 521 and video decoder 522 (FIG. 5).

In an embodiment, the HDR quantization adjustment ΔQP may be added to the QP obtained by the uniform coder 230 (FIG. 2). Then the achieved QP is applied to the native coder 240 (FIG. 2). The QP adjustment is performed in coding-parameters converter 270.

In an embodiment, the complexity estimate may be derived as a mask value for QP determination by a distortion estimator 526 (FIG. 5) having the form:

$$\text{Complexity}_{QP} = m*\text{Complexity}_{HDR}*\text{pow}(\text{HDR\_factor}, n) - k*\log\_2(\text{HDR\_factor}),$$

where n is the exponent and HDR_f actor is the base of the power function. m, n, and k are scalar values. They could be fixed values or could be adaptively determined with the analysis of source signal, the adopted measurements to evaluate CU complexity, and the requirements of coding efficiency and quality. Complexity$_{QP}$ may be applied to the coding parameters determination, for example quantization parameters QPs, by the native coder 520. The derived QP (deonted as QP$_{HDR}$) is applied to video coder 521 and video decoder 522 (FIG. 5).

The foregoing discussion has described operation of the embodiments of the present disclosure in the context of video coders. Commonly, these components are provided as electronic devices. Video coders can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. And, of course, these components may be provided as hybrid systems that distribute functionality across dedicated hardware components and programmed general-purpose processors, as desired.

For example, the techniques described herein may be performed by a central processor of a computer system. FIG. 8 illustrates an exemplary computer system 800 that may perform such techniques. The computer system 800 may include a central processor 810, one or more cameras 820, a memory 830, a transceiver 840 and a coder 850 provided in communication with one another. The camera 820 may perform image capture and may store captured image data in the memory 830. Optionally, the device also may include sink components, such as a display 860, as desired.

The central processor 810 may read and execute various program instructions stored in the memory 830 that define an operating system 812 of the system 800 and various applications 814.1-814.N. The program instructions may perform coding mode control according to the techniques described herein. As it executes those program instructions, the central processor 810 may read, from the memory 830, image data created either by the camera 820 or the applications 814.1-814.N, which may be coded for transmission. The central processor 810 may execute a video coding program that operates according to the principles of FIGS. 2-7. Alternatively, the system 800 may have a dedicated coder 850 provided as a standalone processing system and/or integrated circuit that operates according to the principles of FIGS. 2-7.

As indicated, the memory 830 may store program instructions that, when executed, cause the processor to perform the techniques described hereinabove. The memory 830 may store the program instructions on electrical-, magnetic- and/or optically-based storage media.

The transceiver 840 may represent a communication system to transmit transmission units and receive acknowledgement messages from a network (not shown). In an embodiment where the central processor 810 operates a software-based video coder, the transceiver 840 may place data representing state of acknowledgment message in memory 830 to retrieval by the processor 810. In an embodiment where the system 800 has a dedicated coder, the transceiver 840 may exchange state information with the coder 850.

The foregoing discussion has described the principles of the present disclosure in terms of encoding systems and decoding systems. As described, an encoding system typically codes video data for delivery to a decoding system where the video data is decoded and consumed. As such, the encoding system and decoding system support coding, delivery and decoding of video data in a single direction. In applications where bidirectional exchange is desired, a pair of terminals 110, 120 (FIG. 1) each may possess both an encoding system and a decoding system. An encoding system at a first terminal 110 may support coding of video data in a first direction, where the coded video data is delivered to a decoding system at the second terminal 120. Moreover, an encoding system also may reside at the second terminal 120, which may code of video data in a second direction, where the coded video data is delivered to a decoding system at the second terminal 110. The principles of the present disclosure may find application in a single direction of a bidirectional video exchange or both directions as may be desired by system operators. In the case where these principles are applied in both directions, then the operations described herein may be performed independently for each directional exchange of video.

Several embodiments of the present disclosure are specifically illustrated and described herein. However, it will be appreciated that modifications and variations of the present disclosure are covered by the above teachings and within the purview of the appended claims without departing from the spirit and intended scope of the disclosure.

We claim:

1. A video coding system comprising:
a source of high dynamic range (HDR) data;
a converter having an input for the source of HDR data and an output for data having perceptually uniform luminance quantization;
a first predictive coder, having an input coupled to an output of the converter;
a coding-parameters converter, having an input coupled to the first predictive coder for data representing coding parameters output by the first predictive coder and an output for coding parameters transformed to an HDR space,
a second predictive coder, having an input coupled to the source of HDR data, and
a transmitter, coupled to an output of the second predictive coder, for outputting coded video data representing the HDR data,
wherein the data representing coding parameters output by the first predictive coder and transformed to an HDR space by the coding-parameters converter are input to the second predictive coder.

2. The system of claim 1, wherein the coding parameter data input to the second predictive coder represents a prediction mode selected by the first predictive coder and transformed by the coding-parameters converter.

3. The system of claim 1, wherein the coding parameter data input to the second predictive coder represents a quantization parameter selected by the first predictive coder and transformed by the coding-parameters converter.

4. The system of claim 1, wherein the coding parameter data input to the second predictive coder represents in loop filtering parameters selected by the first predictive coder and transformed by the coding-parameters converter.

5. The system of claim 1, wherein the coding parameter data input to the second predictive coder represents a coding unit size determination selected by the first predictive coder and transformed by the coding-parameters converter.

6. The system of claim 1, wherein the coding parameter data input to the second predictive coder represents a coding unit complexity determination made by the first predictive coder and transformed by the coding-parameters converter.

7. The system of claim 1, wherein the coding parameter data input to the second predictive coder represents a transform unit size determination selected by the first predictive coder and transformed by the coding-parameters converter.

8. The system of claim 1, wherein the coding parameter data input to the second predictive coder represents pixel interpolation data derived by the first predictive coder and transformed by the coding-parameters converter.

9. The system of claim 1, wherein the first and second predictive coders operate according to HEVC.

10. A method of coding high dynamic range (HDR) data, comprising;
converting the HDR data to a domain of perceptually uniform luminance data;
coding the converted data by motion compensated predictive coding; and
coding the HDR data by motion compensated predictive coding, wherein a coding parameter of the HDR data coding is based on a parameter converted from a counterpart coding parameter of the coding of the converted data to an HDR space, and
outputting the coded video data representing the HDR data.

11. The method of claim 10, wherein the counterpart coding parameter is converted from a prediction mode selected during coding the converted data.

12. The method of claim 10, wherein the counterpart coding parameter is converted from a quantization parameter selected during coding the converted data.

13. The method of claim 10, wherein the counterpart coding parameter is converted from an in loop filtering parameter selected during coding the converted data.

14. The method of claim 10, wherein the counterpart coding parameter is converted from a coding unit size determination selected during coding the converted data.

15. The method of claim 10, wherein the counterpart coding parameter is converted from a coding unit complexity determination made during coding the converted data.

16. The method of claim 10, wherein the counterpart coding parameter is converted from a transform unit size determination selected during coding the converted data.

17. The method of claim 10, wherein the counterpart coding parameter is converted from pixel interpolation data.

18. A non-transitory computer readable medium storing program instructions that, when executed by a processing device, cause the device to:
convert the HDR data to a domain of perceptually uniform luminance data;
code the converted data by motion compensated predictive coding; and
code the HDR data by motion compensated predictive coding, wherein a coding parameter of the HDR data coding is based on a parameter converted from a counterpart coding parameter of the coding of the converted data to an HDR space, and
output the coded video data representing the HDR data.

19. A video coding system comprising:
a source of high dynamic range (HDR) data;
a predictive coder, having an input coupled to the source of HDR data and comprising:
a pixel block coder having an input for pixel blocks of the HDR data;
a pixel block decoder having an input for coded pixel blocks of the HDR data output by the pixel block coder;
an in loop filter, having an input for frames of decoded pixel blocks output by the pixel block decoder;
a reference picture store for storage of frames output by the in loop filter;
a predictor, having an input coupled to the reference picture store and an output coupled to the pixel block coder; and
a distortion estimator; and
a transmitter, coupled to an output of the second predictive coder, for outputting coded video data representing the HDR data;
wherein, the pixel block coder, pixel block decoder, in loop filter, reference picture store and predictor operate in a domain of the HDR data, and the distortion estimator operates in a domain of uniform luminance data.

* * * * *